US012670030B2

(12) United States Patent
Premnadh et al.

(10) Patent No.: US 12,670,030 B2
(45) Date of Patent: Jun. 30, 2026

(54) COMPUTING NETWORKING SYSTEM FOR CONTAINER ORCHESTRATION AND METHOD THEREOF

(71) Applicant: Siemens Aktiengesellschaft, Munich (DE)

(72) Inventors: Sreenath Premnadh, Maisach (DE); Harald Müller, Seefeld-Hechendorf (DE); Jürgen Gesswein, Augsburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 368 days.

(21) Appl. No.: 18/387,902

(22) Filed: Nov. 8, 2023

(65) Prior Publication Data

US 2024/0168814 A1 May 23, 2024

(30) Foreign Application Priority Data

Nov. 18, 2022 (EP) .................................... 22208342

(51) Int. Cl.
*G06F 9/50* (2006.01)
(52) U.S. Cl.
CPC ............ *G06F 9/5044* (2013.01); *G06F 9/505* (2013.01); *G06F 2209/501* (2013.01); *G06F 2209/505* (2013.01)
(58) Field of Classification Search
CPC .. G06F 9/5044; G06F 9/505; G06F 2209/501; G06F 2209/505; G06F 9/5066
See application file for complete search history.

(56) References Cited

U.S. PATENT DOCUMENTS

| 2006/0048157 A1 | 3/2006 | Dawson et al. | |
| 2022/0038257 A1* | 2/2022 | Zhang | H04L 63/12 |
| 2023/0161633 A1* | 5/2023 | Wang | G06F 9/5027 |
| | | | 718/105 |

OTHER PUBLICATIONS

Fox Geoffrey et al: "Message-based cellular peer-to-peer grids: foundations for secure federation and autonomic services", Future Generation Computer Systems, Elsevier Science Publishers. Amsterdam, NL, vol. 21, No. 3, Mar. 1, 2005 (Mar. 1, 2005), pp. 401-415, XP027778023, ISSN: 0167-739X.

* cited by examiner

*Primary Examiner* — Dong U Kim
(74) *Attorney, Agent, or Firm* — Schmeiser, Olsen & Watts LLP

(57) ABSTRACT

A computing networking system for orchestrating the distribution of workloads in a containerized computing cluster is provided, including: a plurality of cluster nodes, each configured to receive at least one deployment request containing a number of workloads, wherein a deployment request can be issued by a user to any of the cluster nodes of the computing cluster, and wherein a cluster node to which a deployment request is issued by a user is adapted to become a root node of the issued deployment request and is further configured to distribute, based on its available computational resources, the workloads contained in the issued deployment request or parts thereof among one or more other cluster nodes.

15 Claims, 3 Drawing Sheets

COMPUTING NETWORKING SYSTEM FOR CONTAINER ORCHESTRATION AND METHOD THEREOF

CROSS-REFERENCE TO RELATED APPLICATIONS

This application claims priority to EP Application No. 22208342.0, having a filing date of Nov. 18, 2022, the entire contents of which are hereby incorporated by reference.

FIELD OF TECHNOLOGY

The following relates to the field of computing networking and in particular to a computing networking system for the orchestration of workloads within a containerized computing cluster.

BACKGROUND

Software containers and their orchestration or administration is one of the most widespread solutions to efficiently manage the resources and capabilities of computing clusters. Containers are self-contained software packages to run applications, i.e., they implement all the software dependencies such that executable programs (or more generically workloads) can be run in isolated environments without encountering compatibility issues, for instance when migrating from on-premise data centers to either public or private cloud-based clusters.

There are a number of container engines or orchestrators available in the market, such as Kubernetes or Docker Swarm. Kubernetes is, de facto, the open-source standard solution used by enterprises for orchestrating their containerized workloads. Kubernetes is based on a cluster architecture where there is a central control plane (one or several master nodes) and a number of worker nodes. The master node distributes and schedules the workloads to be executed by the cluster worker nodes for the entire applications deployed in the cluster.

The centralized architecture of Kubernetes has a number of intrinsic limitations. On the one hand, failure or malfunction of the master node(s) and/or its database, or a failure of the connectivity of the master node with the worker nodes compromises the whole system. Moreover, a connectivity failure of the master node(s) with the users entails that new workloads cannot be deployed or currently running ones cannot be modified. On the other hand, the computation and communication requirements associated to the scheduling and management of workloads by a centralized control plane limit the total number of worker nodes and applications that a cluster can support.

In other words, the cluster size is determined by the capabilities of the master node(s), which in practice sets a limitation on how big and heterogeneous a cluster can be. For instance, Kubernetes usually deals with 5000 big and rather homogeneous worker nodes, but it is not adapted to deal with clusters with more cluster nodes and more heterogeneous. As an example, the networks managed in Kubernetes normally span a small number of network zones, e.g., two availability zones (AZs) of the Amazon Web Services (AWS) regions.

There are extensions of Kubernetes that aim at reducing the impact of some of these shortcomings. As an example, KubeEdge introduces a more resilient communication protocol between the master node and the worker nodes. As another example, some version of Kubernetes make it possible to have more than one master node. However, these extensions do not modify significantly the architecture of Kubernetes and the limitations mentioned above, albeit ameliorated, are not eliminated.

There is therefore a lack of flexibility in the container orchestrators currently on the market regarding issues such as the size of the cluster and homogeneity of its nodes. Furthermore, a container orchestration in a computing cluster with centralized architecture is more exposed to failure when it comes to its availability and to network partitioning.

SUMMARY

An aspect relates to an improved architecture for a containerized computing cluster, capable of providing a container orchestrator with a robust availability, scalability and resilience against network partitioning.

A first aspect of embodiments of the invention provide a computing networking system for orchestrating the distribution of workloads in a containerized computing cluster, comprising: a plurality of cluster nodes, each configured to receive at least one deployment request containing a number of workloads, wherein a deployment request can be issued by a user to any of the cluster nodes of the computing cluster, and wherein a cluster node to which a deployment request is issued by a user is adapted to become a root node of the issued deployment request and is further configured to distribute, based on its available computational resources, the workloads contained in the issued deployment request or parts thereof among one or more other cluster nodes.

Hereinafter, a computing networking system is to be understood as an architecture for a computer cluster or a computer network. In embodiments of the present invention, this architecture is much more horizontal, i.e., every node can act as a root node (or master node) of a particular deployment request, in comparison with conventional architectures, where there is a predetermined central control plane with one or more master nodes that administers all the deployment requests and workloads of a cluster.

Workloads are herein to be broadly understood as executable software applications which are packaged in a container for their execution. Orchestrating the distribution of workloads in the computing cluster refers to the administration or scheduling of the workloads based on the available computational resources of the cluster through its nodes.

Depending on its design, structure and/or complexity, a deployment request (or simply a deployment) can be divided into a set of workloads that can be executed by different nodes. The distribution of an assigned workload by a root node is to be understood in this sense. Hereinafter, a deployment will refer to the whole set of workloads sent by a user, while distributed workloads will refer to the possible divisions or partitions of the deployment, which can be executed by the execution environments on the different nodes.

A cluster node, a computing node, or simply a node, is a host execution environment or a server, which is adapted to execute workloads. A cluster node may therefore contain, at least, a central processing unit, CPU, and a non-transitory memory, such as a random-access memory, RAM. A cluster node may further comprise at least one graphics processing unit, GPU, and/or at least one field-programmable gate array, FPGA, and/or at least one application-specific integrated circuit, ASIC and/or any combination of the foregoing. It may further comprise a working memory operatively connected to the at least one CPU and/or the non-transitory memory operatively connected to the at least one CPU and/or the working memory. A cluster node can be realized as a physical machine and/or as a virtual machine or in any combination thereof. It may be realized in hardware and/or software, cable-bound and/or wireless, and in any combination thereof. A cluster node may comprise an interface to an intranet or the Internet, to a cloud computing service, to a remote server and/or the like.

A containerized computing cluster comprises a number of interconnected computing nodes and/or networks of computing nodes, wherein each computing node is endowed with software containers. In particular, the computing cluster may be implemented partially and/or completely in a local apparatus or physical machine, e.g., a computer, in a system of computers and/or partially and/or completely in a remote system such as a cloud computing platform.

In systems based on cloud computing technology, a large number of devices are connected to a cloud computing system via the Internet. The devices may be located in a remote facility connected to the cloud computing system. For example, the devices can comprise, or consist of, equipment, sensors, actuators, robots, and/or machinery in an industrial set-up(s). The devices can be medical devices and equipment in a healthcare unit. The devices can be home appliances or office appliances in a residential/commercial establishment.

The cloud computing system may enable remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via a graphical user interface (e.g., of web applications). The insights and alerts may enable controlling and maintaining the devices, leading to efficient and fail-safe operation of the devices. The cloud computing system may also enable modifying parameters associated with the devices and issues control commands via the graphical user interface based on the insights and alerts.

The cloud computing system may comprise a plurality of servers or processors (also known as 'cloud infrastructure'), which are geographically distributed and connected to each other via a network. A dedicated platform (hereinafter referred to as 'cloud computing platform') is installed on the servers/processors for providing above functionality as a service (hereinafter referred to as 'cloud service'). The cloud computing platform may comprise a plurality of software programs executed on one or more servers or processors of the cloud computing system to enable delivery of the requested service to the devices and its users.

One or more application programming interfaces (APIs) are deployed in the cloud computing system to deliver various cloud services to the users.

A second aspect of embodiments of the present invention provides a computer-implemented method for orchestrating the distribution of workloads in a containerized computing cluster, comprising the following steps: (a) receiving at least a deployment request, which is issued by a user to one of the cluster nodes of the computing cluster, wherein the cluster node is adapted to become the root node of the issued deployment request; and (b) distributing, based on the available computational resources (or capacity) of the root node, the workloads contained in the issued deployment request or parts thereof among one or more other cluster nodes.

In embodiments, the method according to the second aspect of the invention may be carried out by the system according to the first aspect of embodiments of the invention. The features and advantages disclosed herein in connection with the energy management system are therefore also disclosed for the method, and vice versa.

According to a third aspect, embodiments of the invention provide a computer program product (non-transitory computer readable storage medium having instructions, which when executed by a processor, perform actions) comprising executable program code configured to, when executed, perform the method according to the second aspect of embodiments of the present invention.

According to a fourth aspect, embodiments of the invention provide a non-transient computer-readable data storage medium comprising executable program code configured to, when executed, perform the method according to the second aspect of embodiments of the present invention.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, a USB memory stick or the like.

According to a fifth aspect, embodiments of the invention provides a data stream comprising, or configured to generate, executable program code configured to, when executed, perform the method according to the second aspect of embodiments of the present invention.

One of the main ideas underlying embodiments of the present invention is to provide a peer-to-peer (P2P) architecture for orchestrating container workloads among the cluster nodes of a computing cluster, in which each of the cluster nodes can act as an orchestrator of a workload or set of workloads in a deployment. Every node in the cluster can be accessed by a user and assigned (or entrusted with) a deployment request. This selected node then becomes a root node for the particular deployment. As a root node, the cluster node is configured to manage the deployment, i.e., to execute some workloads of the deployment or parts thereof based on its available computing resources or capacity, and to distribute the remaining workloads of the deployment to other cluster nodes. It is a P2P architecture in the sense that every node can be a root node and a worker node. Actually, a cluster node can be simultaneously a root node for a deployment and a worker node for another deployment. The root node can also execute none of the workloads of a deployment and act only as a control plane node.

The computing networking system as described above allows for a simple implementation of a computer-implemented method for orchestrating the distribution of workloads in a containerized computing cluster. The computing cluster receives a deployment request, issued by a user to one of the cluster nodes of the computing cluster, which becomes the root node for that deployment. Based on its available computing resources, the root node splits the deployment and distributes the parts that it will not execute to other cluster nodes.

One advantage of embodiments of the present invention is that the capacity of the computing cluster is not limited to the characteristics of one master node. With the P2P architecture of the computing networking system of embodiments of the invention, if a cluster node suffers a failure, or gets offline, a user can always find a cluster node that will serve as a root node for the deployment. The availability of the computing cluster is therefore more robust than with conventional architectures based on a single predetermined master node.

Another advantage of embodiments of the present invention is that the scalability of the computing cluster is not determined by the characteristics of the master node. Different nodes orchestrate different deployments as root nodes, and thus, contrary to conventional architectures, there is no central node responsible for all the applications running in the cluster. Quite generally, the fact that every node can act as a root node means that there is an improved flexibility as to the size of the network and the heterogeneity of its nodes. In particular, the nodes executing a workload need not be part of a single network.

A further advantage of embodiments of the present invention is that changes in the network topology (prompted by the addition of new nodes or by the disappearance of old ones) can be easily adjusted.

Embodiments and further developments follow from the dependent claims as well as from the description of the different embodiments illustrated in the accompanying figures.

According to some embodiments, refinements, or variants of embodiments, each cluster node comprises a communication unit, configured to implement an application programming interface, API, through which a deployment request issued by a user can be received by the respective cluster node.

Application programming interfaces (APIs) are provided on every node, thus allowing communication with users. In particular, resilient communication protocols, e.g. based on WebSocket APIs, can be employed.

According to some embodiments, refinements, or variants of embodiments, the communication unit is further configured to output, upon user request, a status report of the issued deployment and/or the workloads contained therein; and to make available to the user, upon completion of the execution of the issued deployment, information required to access the executed workloads of the issued deployment.

If the communication unit is endowed with a bidirectional communication protocol, such as a WebSocket API, communication from the node to the user and from the user to the node is possible. The root node can then use the WebSocket API, e.g., to send information and status updates related to the issued deployment back to the user.

As a second application, a user who has submitted a deployment request can send a status request to the root node, which can report back to the user with a status report.

According to some embodiments, refinements, or variants of embodiments, each cluster node comprises a discovery unit, configured to discover, based on certain criteria, the neighboring cluster nodes to which the root node is configured to distribute the workloads of the issued deployment or parts thereof.

The computing cluster architecture of embodiments of the invention is decentralized, which in particular means that each cluster node interacts with a reduced number of neighboring cluster nodes, i.e., nodes that are close according to some proximity criteria. The criteria that define the neighboring set of cluster nodes associated with a cluster node can be, e.g., a hop count threshold. This can be different for each node. For instance, a cluster node with high capacity can adopt a larger hop count threshold than a cluster node with lower capacity, i.e., the neighbor nodes (the nodes to which an assigned workload or parts thereof can be distributed) in the first case will also be larger. This hop count threshold can be re-adjusted depending on the capacity of the cluster node or on changes in the cluster configuration.

With this definition of distance between cluster nodes, neighbor nodes do not necessarily have the same neighbor nodes. Moreover, neighboring nodes do not necessarily have to belong to the same network.

Alternatively, a neighboring criteria can be the belonging to a particular network, in which case every cluster node has the same neighbor cluster nodes.

According to some embodiments, refinements, or variants of embodiments, each root node is configured to distribute the workloads of the issued deployment or parts thereof among the other cluster nodes as a multicast request and/or as a set of unicast requests.

A root node can distribute the workloads with a multicast request among a set of neighboring cluster nodes in order to allocate the workloads as quickly as possible. This of course depends on the communication capacity of the root node. Using a multicast request means that a large number of simultaneous responses from the cluster nodes is expected. In other cases, for instance when the capacity of the root node is more modest, it might be desirable to contact the potential worker nodes with unicast requests. In yet other cases, a combination of multicast and unicast requests can be chosen.

According to some embodiments, refinements, or variants of embodiments, each cluster node comprises an optimization unit, configured to optimize the distribution of the workloads of the issued deployment or parts thereof among the other cluster nodes.

This optimization unit is responsible for determining which workloads of the deployment the root node can keep, based on its available computational resources, and which parts have to be forwarded to other cluster nodes. The optimization unit can also determine the neighboring cluster nodes based on a hop count threshold.

The optimization unit can implement an algorithm. In some embodiments, this algorithm can be continuously improved by an artificial intelligence entity, understood as a computerized entity able to implement different data analysis methods broadly described under the terms artificial intelligence, machine learning, deep learning or computer learning. The artificial intelligence entity can be a convolutional neural network (CNN) or any other neural network.

According to some embodiments, refinements, or variants of embodiments, the one or more other cluster nodes with the available computational resources to execute the distributed workloads of the issued deployment or parts thereof is configured to send an acceptance signal to the root node.

This way the root node keeps track of which workloads can be allocated and executed. In case a multicast signal is sent, it might happen that more than one additional node sends an acceptance signal, indicating its availability to execute the same workload. The root node can then decide, e.g., by using the algorithm of the optimization unit, to which node each workload is to be assigned. For instance, the assignment can be based on the chronological order of the replies or on criteria linked to the characteristics of the cluster nodes. This assignment signal can be also sent as a unicast or a multicast.

According to some embodiments, refinements, or variants of embodiments, the one or more other cluster nodes without the available computational resources to execute the distributed workloads of the issued deployment or parts thereof is configured to send the distributed workloads of the issued deployment or parts thereof to other cluster nodes.

In other words, each cluster node can forward the request sent by the root node in the event that they cannot execute the workloads, either as a multicast request to neighboring cluster nodes or as unicast requests. This goes further in the direction of decentralizing the operations inside the cluster and to foster a peer-to-peer architecture. In particular, this turns out to be a very efficient way of identifying worker nodes in order to have each workload executed. It is therefore possible that a request by a root node sent to neighboring cluster nodes (defined by some of the criteria mentioned above), ends up involving cluster nodes beyond the neighboring circle of the root node.

Alternatively, if the workloads of a deployment or a part thereof has not been accepted by any of the cluster nodes, the root node can be further configured to send the remaining workloads to cluster nodes defined by a second threshold hop count, thus enlarging the first neighboring circle.

According to some embodiments, refinements, or variants of embodiments, a root node is further configured to store an information about all the cluster nodes working on the issued deployment and to send them periodic signals to check their normal operation and/or the progress status of the issued deployment and the workloads contained therein.

As mentioned above, the root node for a particular deployment holds information about the worker nodes involved in the execution of the particular deployment. This information comprises at least an association of each of the additional cluster nodes with their distributed workloads. The root node also monitors their operation by sending them: (a) heartbeat signals, to check if the worker nodes are active and thus detect idle worker nodes; and (b) status signals, in order to check the status of the distributed workload. These signals (and their responses) can be sent, e.g., using the API of the communication unit of each cluster node.

According to some embodiments, refinements, or variants of embodiments, a root node and the other cluster nodes executing the issued deployment are configured to disseminate the data to one another, for instance with a gossip protocol.

This exchange of information among all the cluster nodes involved in a deployment is especially advantageous when one of the worker nodes undergoes a problem, e.g., it gets disconnected or goes idle. The redundancy introduced by the gossip protocol ensures that the information is not lost and can be retrieved.

According to some embodiments, refinements, or variants of embodiments, the root node is further configured, in the event that a cluster node with a distributed workload becomes idle, to send the corresponding workload to other cluster nodes.

When a cluster node goes idle, the root node can re-allocate the workload, which can be taken up by other cluster nodes with available capacity. In the embodiments in which the cluster nodes use a gossip protocol, this takes place in a seamless manner, since the cluster nodes already have the information of the affected distributed workload and its current execution status. The re-assignment can be automatically done by choosing the closest available neighbor node (e.g., the first available cluster node with the smallest hop count from the idle cluster node), which can be determined, e.g., by the optimization unit of the root node or of another node involved in the execution of the deployment.

According to some embodiments, refinements, or variants of embodiments, the system of the invention further comprises a central service registry module, configured to register a cluster node with a profile, wherein the profile of the cluster node comprises information at least about present available computational resources of the cluster node; and/or geographical location of the cluster node; and/or connections of the cluster node inside the computing cluster; and/or description of the technical capabilities of the cluster node; and/or past activity of the cluster node.

The central service registry module is a support service that comprises information about the cluster nodes. This information is useful, in particular, when a user is looking for a root node to issue a deployment request. In some embodiments, access to the information of the central service registry module can take place over a user interface. Based on the input information about the characteristics of a deployment introduced by a user and the information stored about the characteristics of the cluster nodes, the central service registry module can also be configured to show or even rank candidate root nodes in order to assist the decision of the user.

Although here, in the foregoing and also in the following, some functions are described as being performed by modules or units, it shall be understood that this does not necessarily mean that such modules or units are provided as entities separate from one another. In cases where one or more modules or units are provided as software, the modules or units may be implemented by program code sections or program code snippets, which may be distinct from one another, but which may also be interwoven or integrated into one another.

Similarly, in cases where one or more modules or units are provided as hardware, the functions of one or more modules or units may be provided by one and the same hardware component, or the functions of several modules or units may be distributed over several hardware components, which need not necessarily correspond to the modules or units. Thus, any apparatus, system, method and so on which exhibits all of the features and functions ascribed to a specific module or unit shall be understood to comprise, or implement, the module or the unit. In particular, it is a possibility that all modules or units are implemented by program code executed by a computing device, for example a server or a cloud computing platform.

The above embodiments and implementations can be combined with each other as desired, as far as this is reasonable.

Further scope of the applicability of the present method and apparatus will become apparent from the following figures, detailed description and claims. However, it should be understood that the detailed description and specific examples, while indicating embodiments of the invention, are given by way of illustration only, since various changes and modifications within the spirit and scope of embodiments of the invention will become apparent to those skilled in the conventional art.

BRIEF DESCRIPTION

Some of the embodiments will be described in detail, with reference to the following figures, wherein like designations denote like members, wherein.

DETAILED DESCRIPTION

Figure 1:
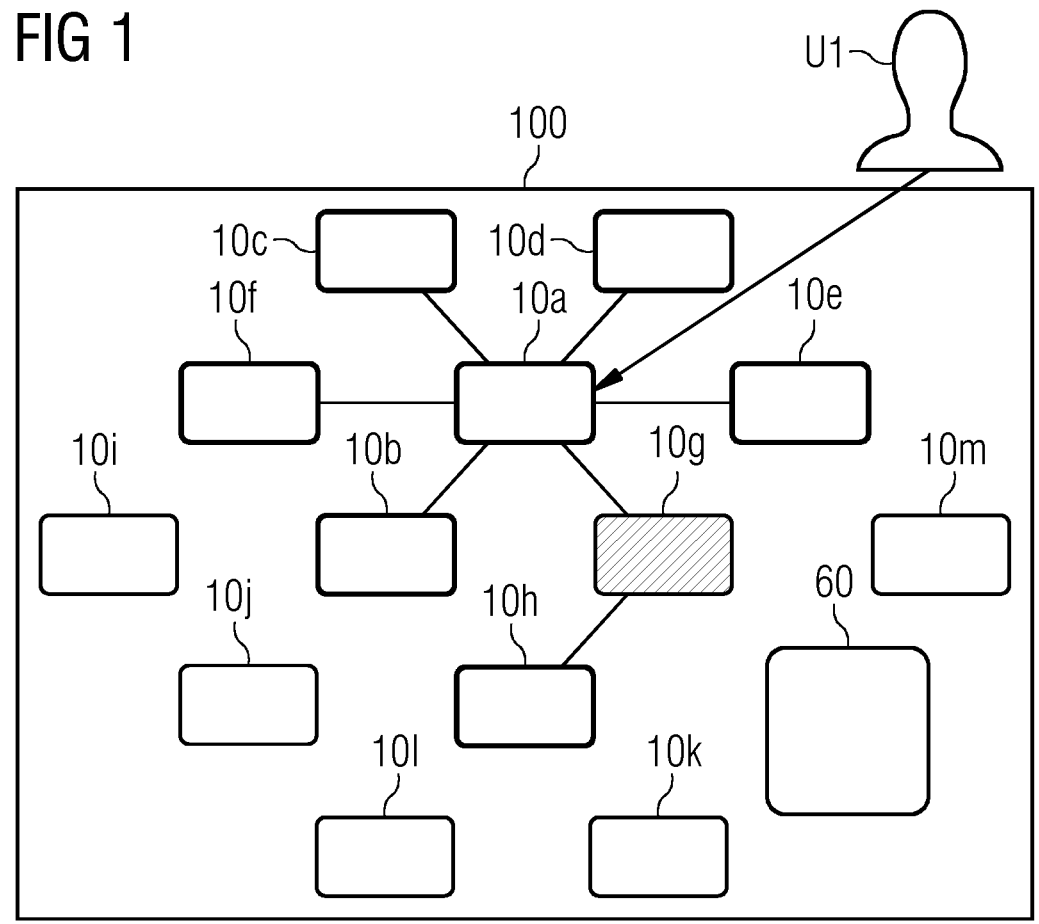
FIG. 1 shows a schematic depiction of one possible operation of the computing networking system for container orchestration according to an embodiment of the present invention.

The components in the drawings are not necessarily to scale, emphasis being placed instead upon clearly illustrating the principles of the present disclosure. Likewise, certain components can be shown in generalized or schematic form in the interest of clarity and conciseness. In some instances, well-known structures and devices are shown in block diagram form in order to avoid obscuring the concepts of embodiments of the present invention.

The numeration of the steps in the methods are meant to ease their description. They do not necessarily imply a certain ordering of the steps. In particular, several steps may be performed concurrently.

The detailed description includes specific details for the purpose of providing a thorough understanding of embodiments of the present invention. However, it will be apparent to those skilled in the conventional art that embodiments of the present invention may be used or implemented without these specific details.

FIG. 1 shows a schematic depiction of one possible operation of the computing networking system 100 for container orchestration according to an embodiment of the present invention. The computing system 100 depicted in FIG. 1 can correspond to a computer cluster on an on-premise data center or on a private or public cloud computing platform.

The computing networking system 100 shown in FIG. 1 comprises a plurality of cluster nodes 10a-10m. Those cluster nodes 10a-10m can be realized either as physical machines or as virtual machines and are to be understood as generic servers adapted to run containerized applications. In FIG. 1, the cluster nodes 10a-10m are schematically depicted as blocks of the same size. However, this does not imply that the cluster nodes 10a-10m must be of the same kind, size or capacity. Actually, in a realistic computing cluster they have different characteristics. FIG. 1 should be interpreted bearing this consideration in mind.

In the embodiment depicted in FIG. 1, the computing networking system 100 also comprises a central service registry module 60, configured to keep a register of the cluster nodes 10a-10m of the computing cluster described by the computing system 100. This registering can also contain profile information relative to the technical characteristics of the different cluster nodes 10a-10m. This can comprise information about: (a) the present capacity of each of the cluster nodes 10a-10m; (b) the geographical location of each of the cluster nodes 10a-10m; (c) the interconnections of the cluster nodes 10a-10m inside the cluster; (d) a description of the technical capabilities of each of the cluster nodes 10a-10m; and (e) the past activity of each of the cluster nodes 10a-10m.

The profiles stored in the central service registry module 60 can be accessed by the cluster users in order to get information about the cluster nodes 10a-10m, prior to sending their deployment requests.

According to the embodiment illustrated in FIG. 1, a user U1, possibly based on information gathered from the central service registry module 60, contacts the cluster node 10a, e.g., by using an application programming interface (API), and entrusts it with a deployment. The cluster node 10a is configured to receive the deployment request and is responsible for the execution of the deployment. The cluster node 10a then becomes the root node for this particular deployment.

The root node 10a is configured, based on its currently available computing resources, to split the workloads of the deployment request, keeping those parts that it will execute, and distributing the remaining parts of the deployment among the other cluster nodes 10b-10m. It is possible that the root node does not execute any of the workloads and acts only as a control plane node.

As FIG. 1 schematically depicts, the root node 10a has the cluster nodes 10b-10g as neighbour cluster nodes. The neighbouring criteria can be, e.g., a hop counting. In FIG. 1, for simplicity, the threshold hop counting is set to 1, and it is assumed that the cluster nodes 10b-10g are within this proximity threshold.

The root node 10a is configured to send request signals to the cluster nodes 10b-10g in order to distribute the workloads of the issued deployment. The root node 10a can send the request signals as a multicast signal with information on all the workloads to be distributed from the deployment. Alternatively, the root node 10a can send the request signals as unicast signals, which can be customized to the characteristics of the different cluster nodes 10b-10g. For instance, some of the unicast signals can contain only certain parts of the workloads of the deployment, depending on the technical capabilities and/or the capacity of each cluster node 10b-10g.

As an exemplary situation, FIG. 1 shows a scenario in which the cluster nodes 10b-10f have capacity to execute the distributed workloads and send an acceptance signal to the root node 10a. The cluster node 10g instead does not have the capacity to execute the distributed workloads and instead forwards the request to the cluster node 10h using, e.g., a unicast signal. The cluster node 10h has a hop counting 2 with respect to the root node 10a, i.e., it is not a neighbour cluster node as defined by the hop counting threshold. This is an instance where the advantages of a peer-to-peer decentralized container orchestration as the one described in embodiments of the invention, especially regarding an efficient administration of the cluster resources, become manifest.

Alternatively, in some other embodiments not depicted in FIG. 1, in the event that the cluster node 10g cannot execute the distributed workloads, the root node 10a would then send a new signal with the pending distributed workloads to extended neighbour cluster nodes, for instance defined by a hop counting 2. This would include, among others, the cluster node 10h.

For simplicity, the situation depicted in FIG. 1 considers only cluster nodes 10b-10h which can or cannot execute the distributed workloads as a whole. In more realistic cases, cluster nodes 10b-10g will generically be able to accept only some parts of the distributed workloads. The end result can therefore be that all the contacted cluster nodes 10b-10g are able to execute some distributed workloads, but most of them will also forward the pending distributed workloads to other cluster nodes (not necessarily shown in FIG. 1). This procedure can be iterated until all the distributed workloads can be executed by, at least, one cluster node 10a-10m. Depending on the complexity of the deployment and the available computing resources and characteristics of the computing cluster, the number of involved cluster nodes 10a-10m in executing a deployment can therefore vary substantially.

Returning to the simplified scenario depicted in FIG. 1, the cluster nodes 10b-10f, 10h have the capacity (the available computational resources) to perform the distributed workload and are configured to send an acceptance signal to the root node 10a, indicating their availability to execute the distributed workloads. The root node 10a further assigns the distributed workloads, for instance by using an optimization algorithm. The cluster nodes 10i-10m were not needed to execute this deployment and were not involved.

According to some of the embodiments of the invention, after the workloads have been distributed, the root node 10a monitors the involved cluster nodes 10b-10f, 10h (the worker nodes for the deployment). This monitoring comprises heartbeat exchanges between the root node 10a and the worker nodes 10b-10f, 10h, in order to make sure that the cluster nodes 10b-10f, 10h are active. These heartbeat exchanges can proceed using the APIs of each cluster node 10a-10f, 10h.

According to some other embodiments, the root node 10a can also send status requests to the cluster nodes 10b-10f, 10h, again using, e.g., its API. With this information, the root node 10a can report to the user, upon request, the progress status of the assigned workload. The root node 10a can also communicate to the user the completion of the deployment, when all the cluster nodes 10b-10f, 10h have executed the distributed workloads. The communication between the user and the root node 10a can take place via a bidirectional API, such as a WebSocket API.

The computing networking system 100 described in FIG. 1 has different mechanisms or measures to increase its resilience against unexpected failures. One such measure is the implementation of a gossip protocol, through which the cluster nodes 10a-10f, 10h share information. This information in particular can comprise information about the distributed workloads. This redundancy via replication of the information guarantees no data loss, in case any of the cluster nodes 10b-10f, 10h has an incidence.

Additionally, the heartbeat exchange of the root node 10a with the cluster nodes 10b-10f, 10h allows the system 100 to detect quickly if one of the worker nodes 10b-10f, 10h becomes idle. In this case, the root node 10a is configured to re-distribute the workloads originally distributed to the idle node to the rest of the cluster nodes 10b-10f, 10h. A gossip protocol among all the involved cluster nodes 10a-10f, 10h has the advantage that all the cluster nodes 10a-10f, 10h have already the information about the workload(s) of the idle cluster node, which ensures an efficient workload re-distribution.

As a concrete example, one could imagine that during the execution of the distributed workloads, the cluster node 10c would become idle. In this case, its distributed workloads can be re-distributed by the root node 10a to the cluster node 10b, which has the capacity to execute the affected workloads, and furthermore had originally sent an acceptance signal for the affected workloads.

Figure 2:
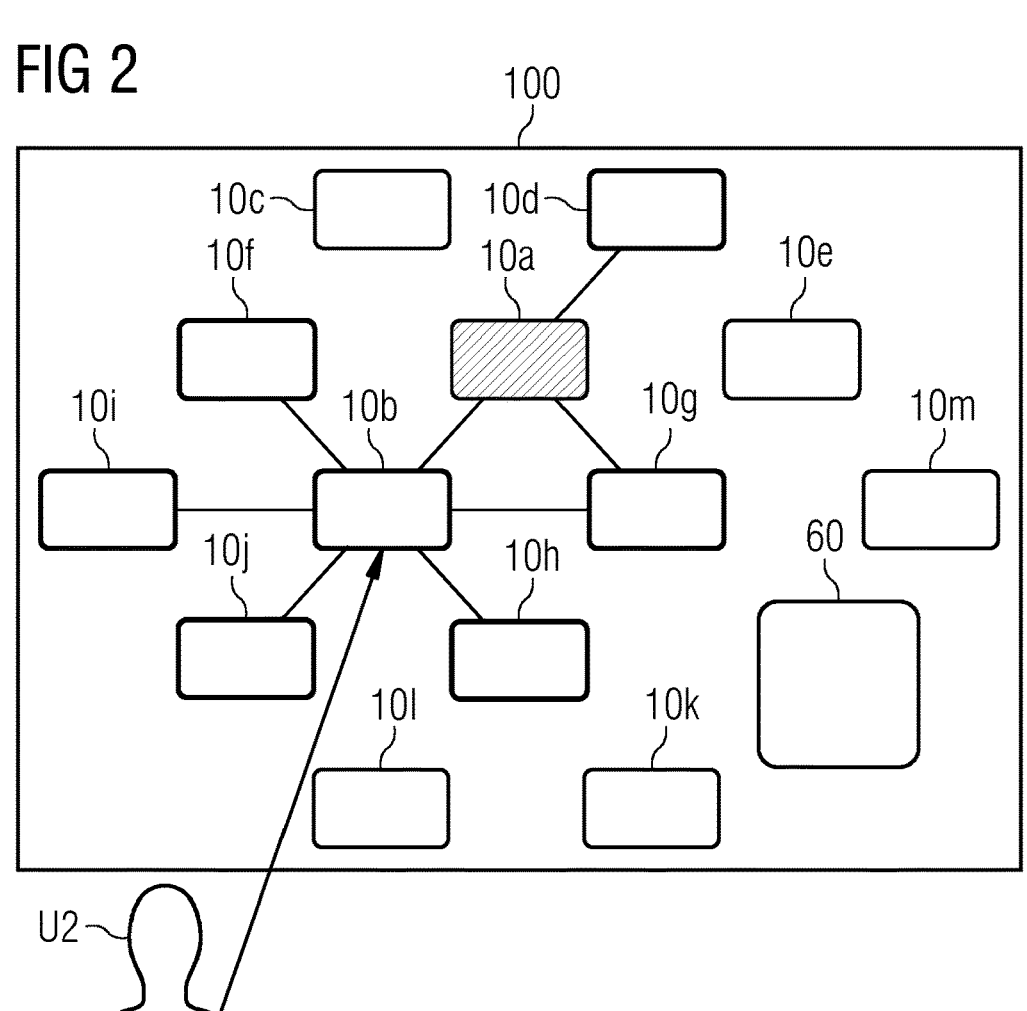
FIG. 2 shows a schematic depiction of another possible operation of the computing networking system for container orchestration according to an embodiment of the present invention.

FIG. 2 shows a schematic depiction of another possible operation of the computing networking system 100 for container orchestration according to an embodiment of the present invention.

In this case, a user U2, possibly based on information gathered from the central service registry module 60, contacts the cluster node 10b, e.g., by using an application programming interface (API), and issues a deployment request.

The cluster node 10b is configured to receive the deployment request and is responsible for its execution. The cluster node 10b then becomes the root node for this particular deployment.

The root node 10b is configured, based on its currently available computing resources, to divide, partition or split the workloads of the deployment request, keeping those parts that it will execute, and distributing the remaining parts of the deployment among the other cluster nodes 10b-10m.

In the situation depicted in FIG. 2, the root node 10b sends requests signals (multicast or unicast) to the neighbour cluster nodes 10a, 10f-10j. The cluster node 10a is unavailable to execute the distributed workloads, and forwards them to the cluster node 10d, which does have the capacity to execute the distributed workloads. The cluster nodes 10d, 10f-10j send an acceptance signal to the root node 10b, which starts the monitoring (in the same terms as described in FIG. 1 for the root node 10a) until the deployment is completed in its execution. The cluster nodes 10i-10m were not needed for this particular deployment and were not even involved.

Interestingly, one could imagine the situations depicted in FIGS. 1 and 2 to take place at overlapping times. The user U1 would then send first a deployment request, choosing the cluster node 10a as the root node, while the user U2 would send another deployment request, choosing the cluster node 10b as the root node. For concreteness, it will be assumed that the user U2 sends its deployment request later than the user U1 sends its deployment request.

The cluster node 10a turns out not to have capacity to execute the distributed workloads corresponding to the deployment of user U2 because his whole capacity is fully deployed in orchestrating the execution of the deployment of user U1. Instead, the cluster node 10b can act concurrently as root node for the deployment of user U2 and worker node for the deployment of user U1.

The cluster node 10g could not accept the distributed workloads in FIG. 1 but did accept the ones in FIG. 2. This could be because the assigned workloads have different technical requirements, and those for the assigned workload of user U2 fitted better the characteristics of the cluster node 10g.

The cluster nodes 10d, 10f and 10h play the role of worker nodes for both the deployment of user U1 and the deployment of user U2.

The situations depicted in FIGS. 1 and 2 therefore not only do they not exclude each other, but they can take place concurrently. The combination of both figures illustrates the P2P architecture of embodiments of the invention, in the sense that every node 10a-10m can be a root node and/or a worker node.

Figure 3:
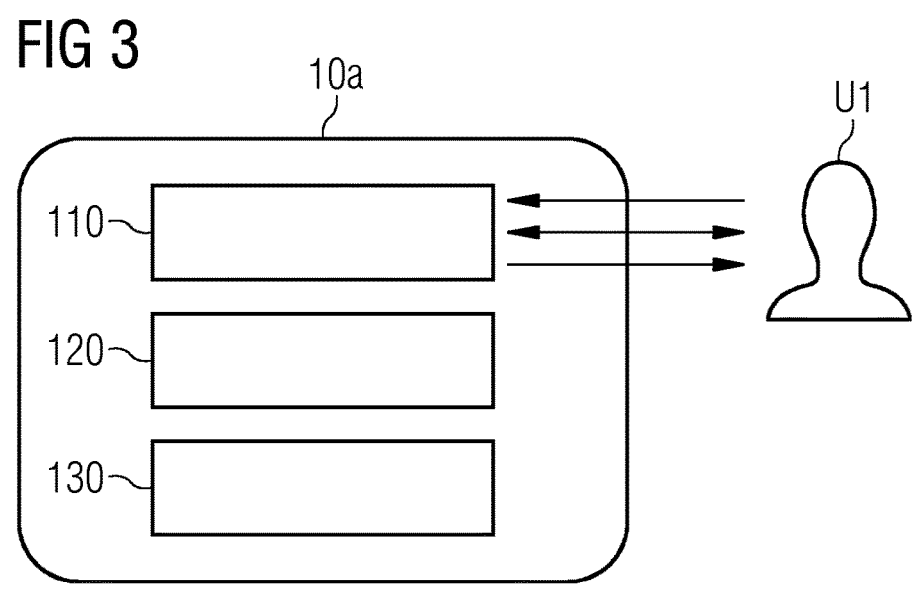
FIG. 3 is a schematic illustration of a cluster node of the computing networking system for container orchestration according to an embodiment of the present invention.

FIG. 3 is a schematic illustration of the cluster node 10a of the computing networking system 100 for container orchestration, in particular the one depicted in FIG. 1, according to an embodiment of the present invention.

The cluster node 10a (in this case a root node) comprises a communication unit 110, a determination unit 120 and an optimization unit 130.

The communication unit 110 is configured to implement an application programming interface (API), through which a deployment request sent by a user can be received. This communication is depicted in FIG. 3 by an arrow pointing from the user U1 to the communication unit 110.

According to some embodiments, a bidirectional API, such as a WebSocket API, is provided, with which the cluster node 10a can output, upon request by the user U1, a status report of the issued deployment. This two-sided communication is represented in FIG. 3 by a two-directional arrow between the user U1 and the communication unit 110.

According to some other embodiments, using the same WebSocket API, the root node 10a can communicate to the user U1 when the deployment is completed. This communication is represented in FIG. 3 by an arrow from the communication unit 110 to the user U1.

The discovery unit 120 is configured to discover the one or more worker nodes 10a-10m to which the cluster node 10a will distribute the workloads contained in the deployment request or parts thereof. The discovery unit 120 can use as proximity criteria for the cluster nodes 10b-10m a threshold hop count, in the way explained in the description of FIG. 1. The threshold hop count can be changed, for instance, in order to enlarge the reach of communication of the cluster node 10a, or also because the cluster topology can change over time, e.g., with the inclusion of additional cluster nodes 10b-10m or the disappearance of some of the cluster nodes 10b-10m.

The optimization unit 130 is configured to optimize the distribution of the workloads contained in the deployment request or parts thereof among the additional cluster nodes 10b-10m. This optimization unit 130 is responsible for determining which parts of the deployment the cluster node 10a (the root node in this case) can keep, based on its available computational resources, and which parts have to be delivered to additional cluster nodes 10b-10m.

The optimization unit 130 can be endowed with an algorithm. In some embodiments, this algorithm can be continuously improved by an artificial intelligence entity, e.g., a convolutional neural network. The algorithm can decide, based on the acceptance signals of the cluster nodes 10b-10m, to which cluster node 10b-10m each of the distributed workloads of the issued deployment is to be assigned. One criterion can be the chronological order of the replies, but more sophisticated choices can be based, e.g., on additional information about the characteristics of the cluster nodes 10b-10m. These characteristics can be obtained, e.g., from a central service registry module 60, such as the one depicted in FIG. 1.

In case one of the cluster nodes 10b-10m goes idle during the execution of one or more workloads of the deployment, the optimization unit 130 can also be adapted to decide to which of the remaining cluster nodes 10b-10m the affected workload(s) can be re-distributed.

Figure 4:
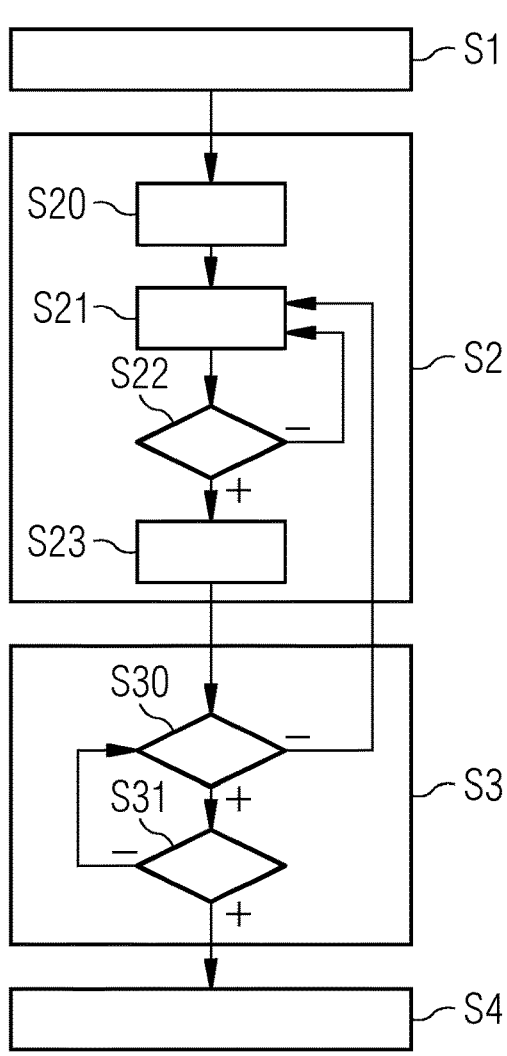
FIG. 4 is a block diagram showing an exemplary embodiment of the computer-implemented method for container orchestration according to an embodiment of the present invention.

FIG. 4 is a block diagram showing an exemplary embodiment of the computer-implemented method for container orchestration according to an embodiment of the present invention, e.g., to be used with the computing networking system described in FIG. 1.

In one step S1, at least a deployment request is received, which is issued by a user to one of the cluster nodes 10a of the computing cluster. The chosen cluster node 10a becomes the root node for the issued deployment. The user U1 can base the choice of root node, e.g., on information obtained from a central service registry module 60.

In another step S2, the root node 10a distributes the workloads of the issued deployment request or parts thereof among a number of cluster nodes 10b-10m. According to the embodiment of the invention depicted in FIG. 4, the distribution in step S2 comprises a number of steps S20 to S23.

In a step S20, the issued deployment is divided into a partition that the root node 10a can execute, based on its capacity or available computational resources, and the remaining part of the deployment. The root node may not execute any workloads and simply act as a control plane node.

In a step S21, the remaining part of the issued deployment is sent out to other cluster nodes 10b-10g. These cluster nodes 10b-10g are chosen based on proximity criteria, e.g., using a hop counting which can be determined by a discovery unit 120 (see FIG. 3). The signal can take the form of a multicast request and/or a series of unicast requests. If a multicast request is chosen, a generic request is sent to the cluster nodes 10b-10g. Alternatively, if unicast requests are chosen, the requests can be customized to the characteristics of the cluster nodes 10b-10g. A combination of multicast and unicast requests is also possible.

In a step S22, the cluster nodes 10b-10g to which the remaining part of the deployment request were sent by the root node 10a send back an acceptance response (described by the symbol + in FIG. 4) or do not reply, in which case a rejection response is assumed (described by the symbol − in FIG. 4). If there is no reply, the step S21 is iterated again, and the affected distributed workloads are sent out to new cluster nodes. According to one embodiment of the present invention, this can be done by the root node 10a itself, e.g., by increasing the hop counting of the discovery unit 120 depicted in FIG. 3. According to other embodiments of the present invention, the cluster nodes 10b-10g are responsible to forward the distributed workloads which they cannot execute to their neighboring cluster nodes.

In case of an acceptance response, in another step S23, the distributed workloads are assigned to the cluster nodes 10b-10f, 10h by the root node 10a. This assignment can be done by the optimization unit 130, depicted in FIG. 3.

In a step S3, the root node 10a monitors the worker nodes 10b-10f, 10h, which execute the distributed workloads.

In a step S31, the monitoring comprises sending heartbeat requests, through which the root node 10a checks whether the worker nodes 10b-10f, 10h are active (i.e., not idle). If a worker node 10b-10f, 10h is idle (described by the symbol − in FIG. 4), step S21 is iterated again and the affected distributed workloads are sent out to new cluster nodes, already worker nodes 10b-10f, 10h with available computing resources. This can be very efficient in case there is a gossip protocol among the worker nodes 10b-10f, 10h, such that the information and execution status of each distributed workload is shared.

If a worker node is active (described by the symbol + in FIG. 4), in a step S32, the monitoring comprises sending a status request, through which the root node 10a can learn about the progress of the execution of the issued deployment as a whole. If the execution is still in progress (described by the symbol − in FIG. 4), step S31 is iterated again and the worker nodes 10b-10f, 10h are monitored through heartbeats.

If the execution of the distributed workloads is completed (described by the symbol + in FIG. 4), in a step S4, the root node 10a returns the required information to the user U1 to access the executed workload(s). This is usually done by indicating an address where the executed workload(s) can be accessed. In some embodiments of the invention, the distributed workloads can be made available to the user as soon as they are allocated and executed, instead of waiting until the whole deployment request has been completed.

Figure 5:
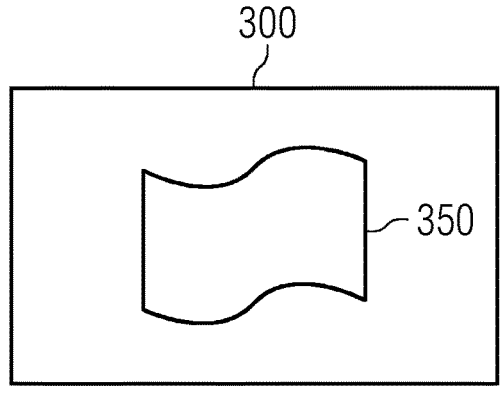
FIG. 5 is a schematic block diagram illustrating a computer program product according to an embodiment of the third aspect of the present invention.

FIG. 5 shows a schematic block diagram illustrating a computer program product 300 according to an embodiment of the third aspect of the present invention. The computer program product 300 comprises executable program code 350 configured to, when executed, perform the method according to any embodiment of the second aspect of the present invention, in particular as it has been described with respect to the preceding figures.

Figure 6:
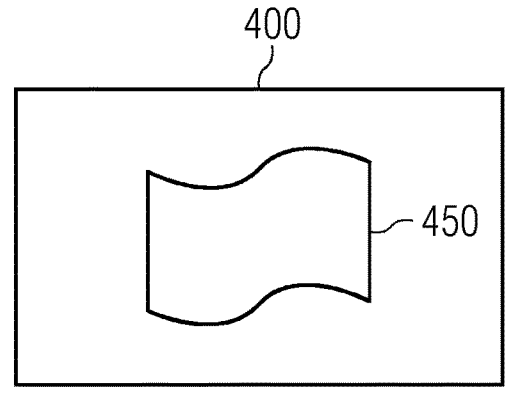
FIG. 6 is a schematic block diagram illustrating a non-transitory computer-readable data storage medium according to an embodiment of the fourth aspect of the present invention.

FIG. 6 shows a schematic block diagram illustrating a non-transitory computer-readable data storage medium 400 according to an embodiment of the fourth aspect of the present invention. The data storage medium 400 comprises executable program code 450 configured to, when executed, perform the method according to any embodiment of the second aspect of the present invention, in particular as it has been described with respect to the preceding figures.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, a USB memory stick or the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computing networking system for orchestrating a distribution of workloads in a containerized computing cluster, comprising:
   a plurality of cluster nodes, each configured to receive at least one deployment request containing a number of workloads;
   wherein a deployment request can be issued by a user to any of the cluster nodes of the containerized computing cluster; and
   wherein a cluster node to which a deployment request is issued by the user is configured to become a root node of the issued deployment request and is further configured to distribute, based on an available computational resources, the workloads contained in the issued deployment request or parts thereof among one or more other cluster nodes.

2. The system according to claim 1, wherein each cluster node comprises a communication unit, configured to implement an application programming interface through which a deployment request issued by the user can be received by the respective cluster node.

3. The system according to claim 2, wherein the communication unit is further configured to output, upon a user request, a status report of the issued deployment and/or the workloads contained therein; and to make available to the user, upon completion of the execution of the issued deployment, information required to access the executed workloads of the issued deployment.

4. The system according to claim 1, wherein each cluster node comprises a discovery unit, configured to discover, based on certain criteria, the neighboring cluster nodes to which the root node is configured to distribute the workloads of the issued deployment or parts thereof.

5. The system according to claim 1, wherein each root node is configured to distribute the workloads of the issued deployment or parts thereof among the other cluster nodes as a multicast request and/or as a set of unicast requests.

6. The system according to claim 1, wherein each cluster node comprises an optimization unit, configured to optimize the distribution of the workloads of the issued deployment or parts thereof among the other cluster nodes.

7. The system according to claim 1, wherein the one or more other cluster nodes with the available computational resources to execute the distributed workloads of the issued deployment or parts thereof is configured to send an acceptance signal to the root node.

8. The system according to claim 1, wherein the one or more other cluster nodes without the available computational resources to execute the distributed workloads of the issued deployment or parts thereof is configured to send the distributed workloads of the issued deployment or parts thereof to other cluster nodes.

9. The system according to claim 1, wherein a root node is further configured to store an information about all the cluster nodes working on the issued deployment and to send them periodic signals to check a normal operation and/or a progress status of the issued deployment and the distributed workloads contained therein.

10. The system according to claim 1, wherein a root node and the other cluster nodes executing the issued deployment are configured to disseminate the data to one another, for instance with a gossip protocol.

11. The system according to claim 1, wherein the root node is further configured, in the event that a cluster node with a distributed workload becomes idle, to send the corresponding workload to other cluster nodes.

12. The system according to claim 1, further comprising a central service registry module, configured to register a cluster node with a profile, wherein the profile of the cluster node comprises information at least about:
   present available computational resources of the cluster node; and/or
   a geographical location of the cluster node; and/or connections of the cluster node inside the computing cluster; and/or
   a description of technical capabilities of the cluster node; and/or
   a past activity of the cluster node.

13. A computer-implemented method for orchestrating the distribution of workloads in a containerized computing cluster, to be implemented with the system according to claim 1, comprising the following steps:
   receiving at least a deployment request, which is issued by the user to one of the cluster nodes of the containerized computing cluster, wherein the cluster node is configured to become the root node of the issued deployment request; and
   distributing, based on the available computational resources of the root node, the workloads contained in the issued deployment request or parts thereof among one or more other cluster nodes.

14. A computer program product, comprising a computer readable hardware storage device having computer readable program code stored therein, said program code executable by a processor of a computer system to implement a method according to claim 13.

15. A non-transient computer-readable data storage medium comprising executable program code, which is configured, when executed, to perform the computer-implemented method according to claim 13.

* * * * *